United States Patent
Zeng

(10) Patent No.: US 8,593,940 B2
(45) Date of Patent: Nov. 26, 2013

(54) METHOD FOR NUMBERING WORKING SERVICES ON CHANNEL PROTECTION RING

(75) Inventor: Yu Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 695 days.

(21) Appl. No.: 12/432,173

(22) Filed: Apr. 29, 2009

(65) Prior Publication Data

US 2009/0207727 A1    Aug. 20, 2009

Related U.S. Application Data

(63) Continuation of application No. PCT/CN2007/003081, filed on Oct. 30, 2007.

(30) Foreign Application Priority Data

Oct. 30, 2006  (CN) .......................... 2006 1 0142723

(51) Int. Cl.
    *G06F 11/00* (2006.01)
(52) U.S. Cl.
    USPC .......................................................... 370/216
(58) Field of Classification Search
    USPC ......................................... 370/216, 222, 223
    See application file for complete search history.

(56) References Cited

U.S. PATENT DOCUMENTS

| | | | |
|---|---|---|---|
| 6,850,483 B1 | 2/2005 | Semaan | |
| 7,650,075 B2 * | 1/2010 | Kikuchi | 398/83 |
| 2001/0015979 A1 * | 8/2001 | Hata et al. | 370/403 |
| 2002/0080829 A1 * | 6/2002 | Ofek et al. | 370/539 |
| 2003/0031127 A1 | 2/2003 | Saleh et al. | |
| 2006/0133802 A1 | 6/2006 | Tian et al. | |

FOREIGN PATENT DOCUMENTS

| | | |
|---|---|---|
| CN | 1193852 | 9/1998 |
| CN | 1555163 | 12/2004 |
| CN | 1725676 A | 1/2006 |
| CN | 1738213 A | 2/2006 |
| CN | 1791048 | 6/2006 |
| CN | 1972235 A | 5/2007 |

(Continued)

OTHER PUBLICATIONS

International Search Report from P.R. China in International Application No. PCT/CN2007/003081 mailed Jan. 31, 2008.

(Continued)

*Primary Examiner* — Mark Rinehart
*Assistant Examiner* — Mohammad Anwar
(74) *Attorney, Agent, or Firm* — Staas & Halsey LLP

(57) ABSTRACT

A method for numbering working services on a channel protection ring. The process of numbering working services includes: after detecting that the node has an added or dropped working service in the downstream segment in the specified direction, the node on the ring sends a notification message which includes the identifier corresponding to the node to the downstream node in the specified direction; after receiving the notification message and detecting that the node has an added or dropped working service in the downstream segment in the reverse direction of the specified direction, the node on the ring assigns a serial number to the working service according to the identifier in the notification message. The present invention enables automatic numbering of services and dynamic adjustment of the service numbers on the ODUk protection ring, and fulfills the requirements of ODUk protection switching.

7 Claims, 4 Drawing Sheets

(56) References Cited

FOREIGN PATENT DOCUMENTS

| | | |
|---|---|---|
| CN | 100426776 | 10/2008 |
| EP | 1 209 834 | 5/2002 |
| EP | 1 303 110 | 4/2003 |
| JP | 6 120966 | 4/1994 |

OTHER PUBLICATIONS

English Translation of the Written Opinion of the International Searching Authority mailed Jan. 31, 2008 for PCT Application No. PCT/CN/2007/003081, 6 pgs.

EPO Communication dated Dec. 11, 2009, forwarding the extended European Search Report. The extended European Search Report, pursuant to Rule 62 EPC, the supplementary European Search Report and the European Search Opinion 6 pgs.

Wu Jian-xue "ODUk Shared Protection Ring in the OTN", Wuhan Research Institute of Posts and Telecommunications, Wuhan 430074, China, 1994-2009 China Academic Journal Electronic Publishing House, http://www.cnki.net 4 pgs.

Wu, Jian-xue, "Fault Monitoring and APS Signaling Convection Mechanism in OTN", Wuhan Research Institute of Posts and Telecommunications, Wuhan 430074, China, 1994-2009 China Academic Journal Electronic Publishing House, http://www.cnki.net, 5 pgs.

* cited by examiner

METHOD FOR NUMBERING WORKING SERVICES ON CHANNEL PROTECTION RING

CROSS REFERENCE TO RELATED APPLICATIONS

This application is a continuation of International Patent Application No. PCT/CN2007/003081, filed Oct. 30, 2007, which claims priority to Chinese Patent Application No. 200610142723.0, filed Oct. 30, 2006, both of which are hereby incorporated by reference in their entirety.

TECHNICAL FIELD

The present invention relates the Optical Transport Network (OTN) technology, and in particular, to a method for numbering working services on a channel protection ring.

BACKGROUND

Currently, in the optical network transmission process, the service transmission is vulnerable to adverse events such as fiber cut. In order to improve reliability of service transmission and improve the availability of the optical network, the corresponding protection actions must be taken in the optical transmission network in view of possible events unfavorable to service transmission. Generally, the protection action is to use standby resources to protect active resources. When the active resources fail, the corresponding service transmission is implemented through the standby resources.

Currently, a shared protection ring may be used to protect services in an Optical Transport Network (OTN). In the ITU_T G.783.2 recommendations, the shared protection ring of an Optical channel Data Unit of k order (ODUk) in an OTN is configured through the following steps:

1. Specifying the working channel ODUk to be protected on the protection ring. Corresponding to the working service, only one ODUk working service can exist between two nodes in pairs in a protection ring.
2. Numbering such working services.
3. Specifying the nodes of the protection ring. The nodes must be capable of adding or dropping working services or extra services in a protection ring.
4. Identifying extra services on a ring.

FIG. 1 is an example of configuring an ODUk protection ring. The box in FIG. 1 represents each NE node of the protection ring, the arrowhead means adding/dropping (which means inserting or extracting, and adding or reducing) a working service on the protection ring. The outer ring is a working channel, which bears four ODUk working services numbered 1, 2, 3 and 4. The inner ring is a protection channel, on which extra services are configured. The dashed line represents bandwidth not used in the protection group.

For the ODUk ring protection, when protection switching occurs on a ring, the nodes on the protection ring interact with each other through an Automatic Protection Switching (APS) byte. The APS byte is defined in FIG. 2, and the fields of the APS byte are defined below:

Request—priority of switching request;
S—the switching and status request value is 1, and the status notification value is 0;
N—the value of the local request is 0, and the value of the remote request is 1;
Requested Channel—channel requested to switch;
Bridged Channel—channel already bridged to the protection;
Status Channel—for status notification message only, indicating the channel related to the status message;
The value of a channel number is: 0=empty signal; 1~254=ODUk working service number on the protection ring; 255=extra service signal.

Taking the service configuration in FIG. 1 as an example. When Signal Failure (SF) of receiving service 2 is detected on network element A, network element A sends a notification to all other nodes throughout the ring through an APS byte, and indicates a protection switching request for service 2 by assigning the value "2" to the Requested Channel field. In the subsequent interaction, a value "2" is assigned to the Bridged Channel field in the APS byte, if the switching node performs bridging for service 2. In a word, in the ODUk protection ring, the network elements interact with each other through an APS, while the APS byte uses a unique service number in the ring to indicate the bridge switching request for a specific service. The detailed protection switching process is described in ITU-T G.873.2 draft (200305).

In view of the configuration of the protection ring and the use of the APS byte in the protection switching process, the serial numbers of the working services on the ODUk protection ring are characterized by:

1. The service number of the ODUk of each working service is unique, and must not be duplicate.
2. A maximum of one working service may coexist on each segment of a protection ring, namely, may correspond to at most one service number.
3. Taking the request channel field in the APS byte as an example, a byte represents a service number, "0" indicates no switching request for the working service, and "255" indicates an extra service. Therefore, values of the serial number of working services range from 1 to 254.

The ITU-T recommendation sets forth the requirements such as the value range of the serial number a working service on the ODUk protection ring, and describes how to use the serial number to implement the interaction process of protection switching, but does not stipulate how to create such serial numbers automatically.

In the prior art, the concept of a ring chart in multiplex section protection in the Synchronous Digital Hierarchy/Synchronous Optical NETwork (SDH/SONET) and the method of creating such a ring chart automatically tend to be confused with the serial number of the working service. In the multiplex section protection ring in the SDH/SONET, a node number which is unique throughout the ring is configured for each node, and the value range of the node number is 0~15. However, a ring chart of the multiplex section needs to be created for each node in the multiplex section ring. The ring chart specifies the nodes (identified by node numbers) on the multiplex section ring, and the topology relation of such nodes. A general method for creating a ring chart automatically is: The ring node sends a message, which is circulated around the protection ring, and terminated at the source node. Each ring node that circulates the message affixes the corresponding multiplex section node number to the message sequentially. When the message arrives at the source node, the ring chart of the whole multiplex section ring is understandable according to all ring nodes recorded in the message and the sequence of the ring nodes.

However, the foregoing method does not number the working services automatically on an ODUk protection ring. The foregoing method aims to let every node on the multiplex section ring understand the node configuration and node topology on the ring, and is independent of the specific service configuration. However, the ODUk protection ring cares how to allocate an identifier which is unique throughout the ring to each working service, and a consensus needs to be reached at both ends of the service without caring about the topology relation between nodes. If the services are numbered automatically by circulating the message around the protection ring, the implementation mechanism is rather complicated and is dependent on the communication between nodes, and is less reliable than expected.

SUMMARY

In view of the foregoing problems, the present invention provides a method for numbering working services on a channel protection ring, which simplifies the process of numbering working services and accomplishes high reliability.

In order to fulfill the foregoing objectives, a method for numbering working services on a channel protection ring is provided in an embodiment of the present invention, including: allocating an identifier to each node on the protection ring, and specifying a direction on the protection ring. The steps of numbering working services include:

after detecting that the node has an added or dropped working service in the downstream segment in the specified direction, the node on the ring sends a notification message that includes the identifier of the node to the downstream node in the specified direction; and after receiving the notification message, the node on the ring numbers the working service according to the identifier in the notification message, if the node has an added or dropped working service in the downstream segment in the reverse direction of the specified direction.

Further, a method for numbering working services on a channel protection ring is provided in an embodiment of the present invention, including: allocating an identifier to each node on the protection ring, and specifying a direction on the protection ring. The steps of numbering working services include:

after detecting that the node has an added or dropped working service in the downstream segment in the specified direction, the node on the ring numbers the working service according to the identifier of the node, and sends a notification message that includes the service number to the downstream node in the specified direction; and after receiving the notification message, the node on the ring records the received service number, if the node has an added or dropped working service in the downstream segment in the reverse direction of the specified direction.

Further, an apparatus for numbering working services on a channel protection ring is provided in an embodiment of the present invention, including:

an allocating module, adapted to allocate an identifier to each node on the protection ring, and specify a direction on the protection ring;

a first triggering module, adapted to trigger the first sending module when the node on the ring has an added or dropped working service on the downstream segment in the specified direction;

a first sending module, adapted to send a notification message that includes the identifier of the node to the downstream node in the specified direction after being triggered by the first triggering module;

a second triggering module, adapted to trigger the first numbering module when the node on the ring has an added or dropped working service on the downstream segment in the reverse direction of the specified direction after receiving a notification message sent by other nodes; and a first numbering module, adapted to number the working service according to the identifier in the notification message sent by other nodes after being triggered by the second triggering module.

Further more, an apparatus for numbering working services on a channel protection ring is provided in an embodiment of the present invention, including:

an allocating module, adapted to allocate an identifier to each node on the protection ring, and specify a direction on the protection ring;

a third triggering module, adapted to trigger the third numbering module when the node on the ring has an added or dropped working service on the downstream segment in the specified direction;

a third numbering module, adapted to trigger the third sending module after numbering the working service according to the identifier of the node as triggered by the third triggering module;

a third sending module, adapted to send a notification message that includes the service number to the downstream node in the specified direction; and a recording module, adapted to record the received service number, after receiving the notification message sent by other nodes, when the node has an added or dropped working service in the downstream segment in the reverse direction of the specified direction.

The embodiments of the present invention accomplish the following benefits:

numbering the working services on the protection ring automatically;

updating the working service number automatically in real time when the ring topology or service configuration changes;

the process of numbering the working service is simplified and highly reliable;

interaction is required only between the nodes traversed by a service;

the processing algorithm is simplified and independent of the communication of other nodes; and enhancing the reliability and robustness of the automatic service numbering.

DETAILED DESCRIPTION

Figure 1:
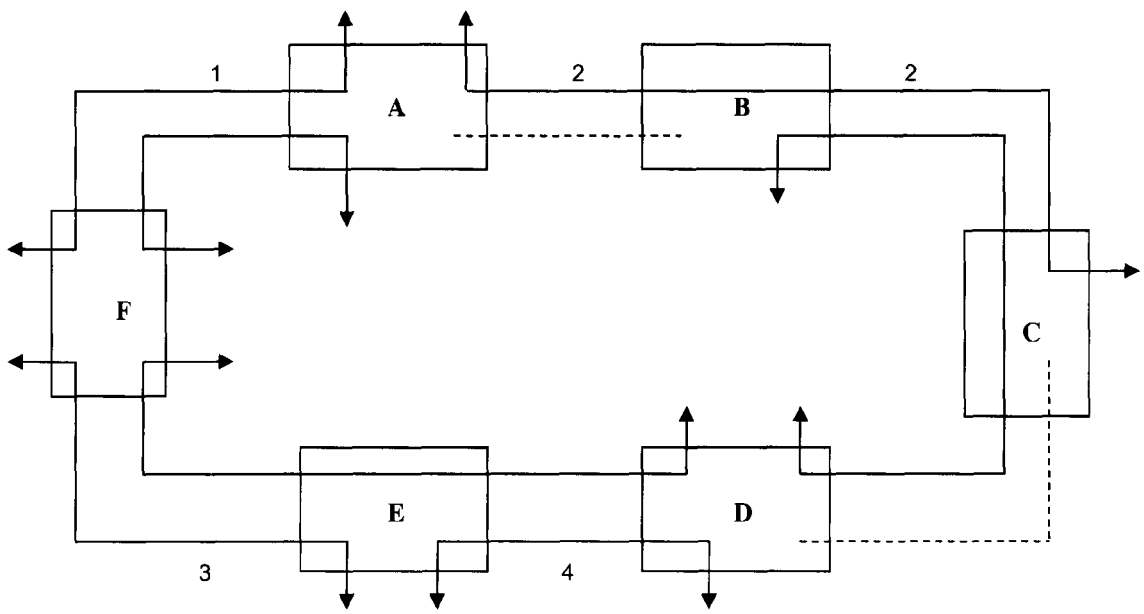
FIG. 1 shows the configuration of an ODUk protection ring in the prior art.
Figure 2:
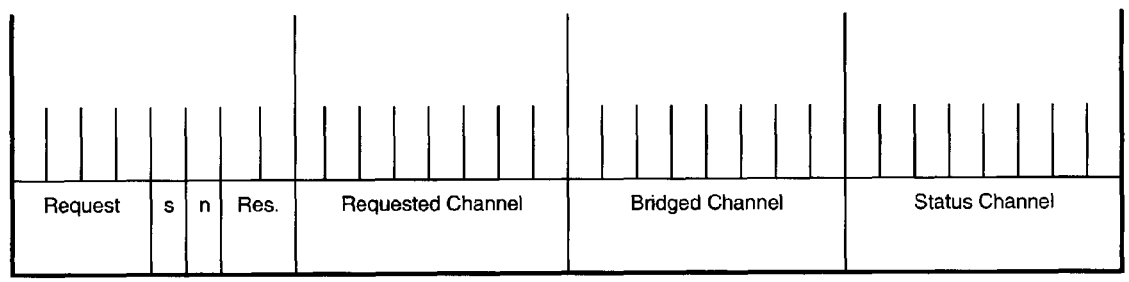
FIG. 2 shows the APS byte in the prior art.

In order to make the technical solution and merits of the present invention clearer, a detailed description of the present invention is hereinafter given with reference to accompanying drawings and preferred embodiments.

Considering that the ITU-T recommendations do not clarify how to number working services on an ODUk protection ring, the present invention puts forward a method for numbering working services automatically. The method performs automatic service numbering and dynamic adjustment on the ODUk protection ring, thus fulfilling the requirements of the ODUk protection switching.

Embodiment 1

This embodiment allocates an identifier (ID) which is unique throughout a ring to each node in a protection ring, uses the unique ID of the node on the ring as a basis for service numbering, and performs interaction on the ring. Finally, based on the unique identifier of each node on the ring, the embodiment generates a serial number for each working service on the ODUk protection ring. The detailed process is as follows:

1. Allocating an ID (represented by "Y" herein) which is unique throughout a ring to each node on the protection ring, where the unique ID of the node for generating a service number may be ring node ID or another ID allocated automatically according to the IP or allocated manually.

2. Specifying a unified direction (clockwise, as supposed herein; or counterclockwise) on the ring, and the clockwise direction in taken as an example herein.

3. Each node on the ring performs service numbering like this:

if the node has a working service added or dropped from the protection ring in the downstream segment in the clockwise direction of the protection ring, notifying the foregoing Y value to the clockwise downstream ring node (for example, adjacent downstream node) through a message such as a service number message.

4. The node on the ring performs the following operations after receiving the foregoing service numbering message:

if the node has a working service added or dropped from the protection ring in the counterclockwise downstream segment, recording the Y value in the message; and if the node has no working service added or dropped from the protection ring in the counterclockwise downstream segment and the working service passes through the specified direction, forwarding the message to the next ring node in the clockwise direction.

5. Because the Y value of each node is unique throughout the ring, both ends of the working service may assign a serial number to the working service uniformly on the basis of such an ID. For example, the ID may be used directly as a serial number of the working service, or the serial number of the service is calculated by using such an ID. If the IP address is used as an ID unique throughout the ring, if all nodes on an ODUk protection ring are configured into an IP network segment with the mask "255.255.255.0", the lower 8 bits of the IP address may be used as the serial number of the working service through calculation. However, the present invention is not limited to that because the service number corresponding to the ID can be easily obtained through calculation based on the node ID. In this way, the working service number which is unique throughout the ring is obtained (but the final working service number value must fall within 1~254, which is not discussed herein). In this embodiment, both ends of a working service may number the working service simultaneously to obtain a working service number which is unique throughout the ring; or the receiver of the working service ID assigns a serial number to the working service and notifies the serial number to the peer end (ID originator) of the working service, or notifies the numbering algorithm or numbering mode to the peer end, and the peer end performs numbering based on the same algorithm or mode.

When the topology or service configuration is changed on the ring, the node on the ring may originate the foregoing service numbering process instantly or periodically, so that the service number can be updated and checked automatically in real time.

Figure 3:
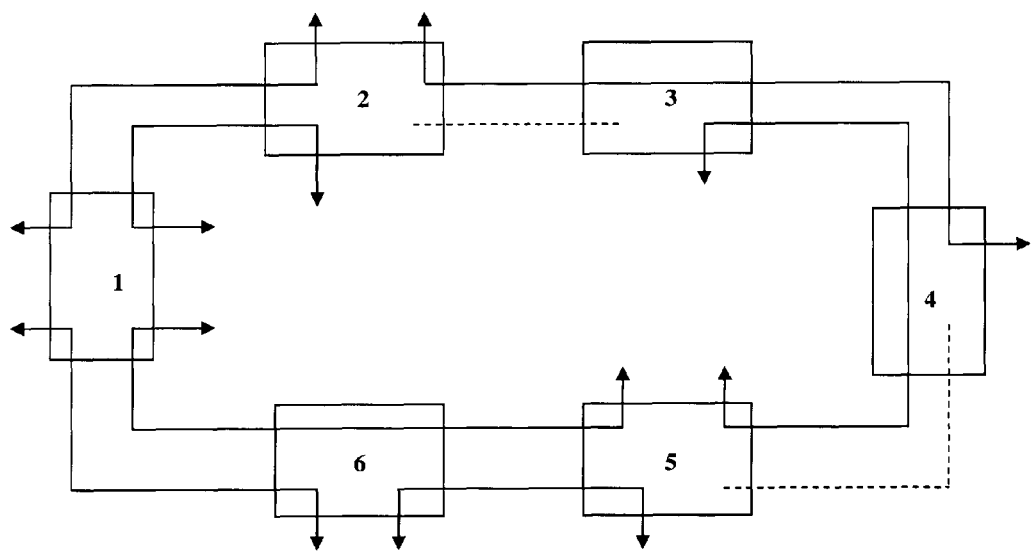
FIG. 3 shows the service configuration of an ODUk protection ring according to an embodiment of the present invention.

FIG. 3 shows the service configuration of an ODUk protection ring in an embodiment of the present invention (where the outer ring indicates the working channel, and the inner ring indicates the protection channel). Taking FIG. 3 as an example, the process of numbering the working services automatically is described below. The process includes the following steps:

1. Specifying the ring node number as a unique ID throughout the ring for each node of the protection ring.

2. Specifying the clockwise direction as a unified direction.

3. Node 2 detects that it has a working service added or dropped from the protection ring in the clockwise downstream segment, and hence sends a message to the clockwise downstream ring node 3 (such as adjacent node 3), notifying the ID value "2".

4. Node 3 has no working service added or dropped from the protection ring in the counterclockwise downstream segment but has a working service traversing the clockwise direction, and hence forwards the message to node 4 in the clockwise direction.

5. Node 4 has a working service added or dropped from the protection ring in the counterclockwise downstream segment, and hence records the value ID "2".

6. Node 2 and node 4 may use the value ID "2" to number the working service directly. The serial number of the working service assigned by both ends of the working service is the same and unique throughout the ring.

Figure 4:
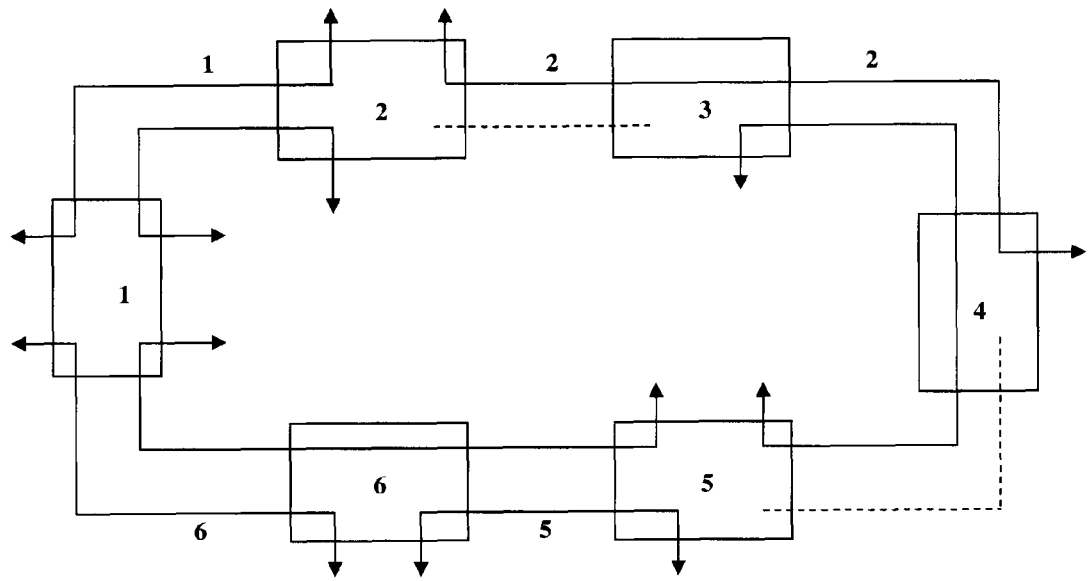
FIG. 4 shows the serial number of a working service of an ODUk protection ring according to an embodiment of the present invention.

7. Likewise, node 5, node 6 and node 1 originate the process of numbering the working service, which may be synchronous to the process originated by node 2, or asynchronous in a certain sequence, for example, in the sequence of the ring node number). Finally, a serial number unique throughout the ring is assigned to each service on the protection ring. Starting from node 1, the four working services are finally numbered 1, 2, 5 and 6 in the clockwise direction, as shown in FIG. 4.

Through the foregoing steps, the working services on the protection ring are numbered automatically. When the ring topology or service configuration of the protection ring changes, the working services may be numbered again automatically, thus updating the working service numbers automatically in time.

Moreover, the process of numbering working services in embodiment 1 is simple and highly reliable. In embodiment 1 of the present invention, interaction is required on only the nodes traversed by the service, which simplifies the processing algorithm, makes the process independent of the communication with other nodes and enhances the reliability and robustness of the automatic service numbering.

The present invention defines multiple modes of obtaining the ID which is unique throughout the ring and owned by each logic node on the protection ring. The method applied in the foregoing embodiment 1 of the present invention is: configuring a node number for each node manually, with the node number ranging from 1 to 254 (like the node number configured for each node of the multiplex section ring in the SDH, except that the serial number of the multiplex section ring node ranges from 0 to 15). Other methods may also be applied. For example, if all nodes on an ODUk protection ring are configured in an IP network segment with the mask "255.255.255.0", the lower 8 bits of the IP address may be used directly as the unique identifier or service number throughout the ring.

Embodiment 2

In the foregoing embodiment 1, a node on the protection ring at one end of a working service notifies the identifier of the node to the other side of the working service, and the other end assigns a serial number to the working service based on the identifier. In embodiment 2, a node on the protection ring at one side of a working service assigns a serial number to the working service based on the node ID, and then notifies the serial number to the node at the other side of the working service. The detailed process is as follows:

1. Allocating an identifier which is unique throughout the ring to each node on the protection ring, for example, specifying the ring node number as a unique identifier throughout the ring for each node of the protection ring.

2. Specifying a direction such as the clockwise direction as a unified direction.

3. Each node on the ring performs service numbering like this:

if the node has a working service added or dropped from the protection ring in the downstream segment in the clockwise direction of the protection ring, assigning a serial number to the working service based on the identifier of the node, and notifying the serial number to the clockwise downstream ring node (for example, adjacent downstream node) through a message such as a service number message. In this embodiment, the node identifier is used as a serial number of the working service directly. Taking FIG. 3 as an example, node 2 detects that it has a working service added or dropped from the protection ring in the clockwise downstream segment, assigns a serial number "2" to the working service, and sends a message to the adjacent ring node 3 (namely, adjacent downstream node 3) in the clockwise direction, notifying the serial number "2" of the working service.

4. The node on the ring performs the following operations after receiving the foregoing service numbering message: if the node has a working service added or dropped from the protection ring in the counterclockwise downstream segment, recording the service number in the message; if the node has no working service added or dropped from the protection ring in the counterclockwise downstream segment and the working service passes through the specified direction, forwarding the message to the next ring node in the clockwise direction. If node 3 has no working service added or dropped from the protection ring in the counterclockwise downstream segment but has a working service traversing the clockwise direction, and hence forwards the message to node 4 in the clockwise direction. Node 4 has a working service added or dropped from the protection ring in the counterclockwise downstream segment, and then records the service number "2".

5. Therefore, both ends (node 2 and node 4) of the working service obtain a service number which is consistent and unique throughout the ring.

6. Likewise, node 5, node 6 and node 1 originate the process of numbering the working service, which may be synchronous to the process originated by node 2, or asynchronously in a certain sequence, for example, in the sequence of the ring node number). Finally, a serial number unique throughout the ring is assigned to each service on the protection ring. Starting from node 1, the four working services are finally numbered 1, 2, 5 and 6 in the clockwise direction, as shown in FIG. 4.

When the topology or service configuration is changed on the ring, the node on the ring may originate the foregoing service numbering process instantly or periodically, so that the service number can be updated and checked automatically in real time.

Embodiment 3

Figure 5:
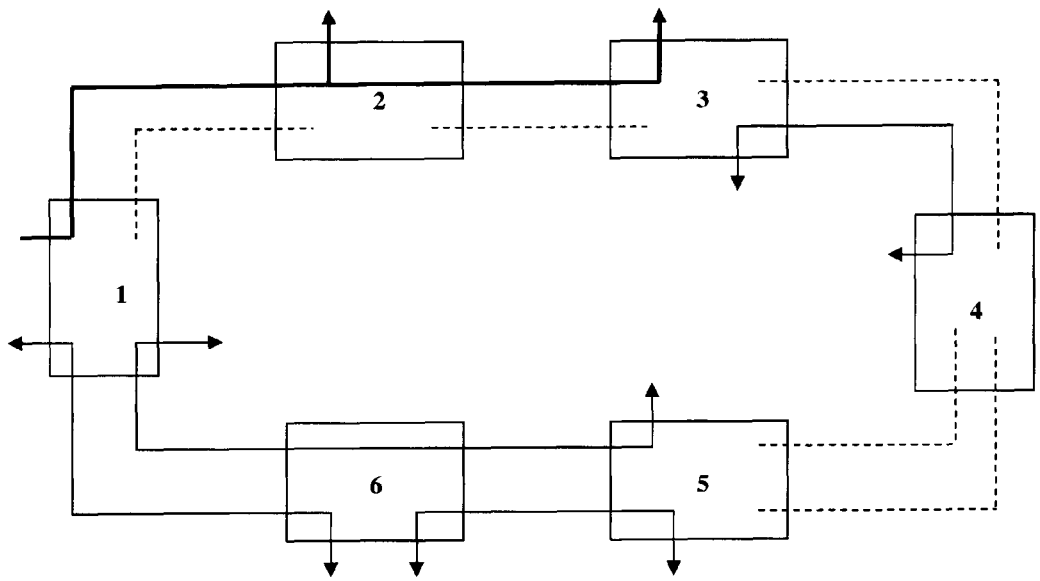
FIG. 5 shows the service configuration of multicast according to an embodiment of the present invention.

Embodiment 3 of the present invention describes the serial number of multicast services. Here a multicast service sent to multiple nodes is equivalent to multiple services for being numbered. The service configuration is shown in FIG. 5. In FIG. 5, the multicast service is sent from node 1, and received at node 2 and node 3.

Figure 6:
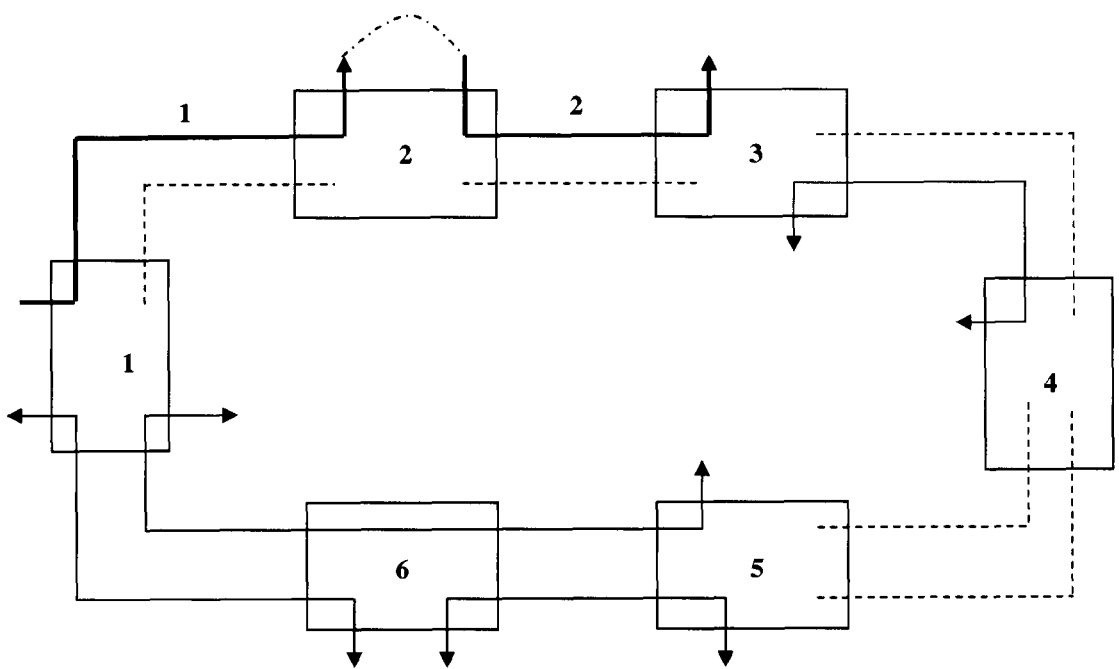
FIG. 6 shows the serial number of a multicast service according to an embodiment of the present invention.

For such multicast services, it is equivalently regarded as: node 2 receives a working service from node 1, and sends another working service to node 3. In this way, the multicast service is equivalent to two working services shown in FIG. 6. The difference lies in that: the service content received by node 2 from node 1 is the same as the service content sent by node 2 to node 3. For service numbers, it does not matter whether the two services are the same. In this way, the service numbering method may be applied in the foregoing first (or second) embodiment of the present invention so that the multicast service is equivalent to two services numbered 1 and 2.

In another example, if the multicast service starts from node 1 and is received at node 2 and node 4, it is equivalent to: node 2 receives a working service from node 1, and sends another working service to node 4. Therefore, the multicast service can also be equivalent to two services, which are numbered separately.

As described above, for a multicast service with two destination nodes, the multicast service may be split into two services on the node where the service passes through and is dropped.

Likewise, for the multicast service with n destination nodes, there are n−1 nodes which the service passes through and which the service is dropped from. Therefore, a multicast service may be split into n working service, namely, one multicast service is equivalent to multiple services for being numbered.

The embodiments described above are only preferred embodiments of the invention and are not intended for limiting the invention. Any modification, equivalent substitution, and improvement without departing from the spirit and principle of this invention shall be covered in the protection scope of the invention.

What is claimed is:

1. A method for numbering working services on a protection ring of an Optical channel Data Unit of k order (ODUk channel protection ring), comprising:

allocating an identifier to each node on the ODUk channel protection ring;

specifying a direction on the ODUk channel protection ring;

sending, by a first node on the ODUk channel protection ring, a notification message in the specified direction to a second node downstream of the first node in the specified direction after detecting that the first node has an added or dropped working service in a first downstream segment in the specified direction, the notification message including the identifier of the first node;

receiving, by the second node, the notification message; and judging, by the second node, whether the second node has the added or dropped working service in a second downstream segment in a reverse direction of the specified direction;
  if not, forwarding, by the second node, the received notification message in the specified direction to a node downstream of the second node in the specified direction when determining that the working service passes through in the specified direction;
  if so:
    assigning, by the second node, a serial number to the working service according to the identifier in the notification message; and
    returning, by the second node after assigning the serial number to the working service according to the identifier, the serial number to the first node corresponding to the identifier.

2. The method of claim 1, further comprising:
assigning, by the first node corresponding to the identifier, the serial number to the working service according to the identifier.

3. The method of claim 1, wherein:
a multicast service with multiple destination nodes is split into multiple working services on the node where the service passes through and is dropped.

4. The method of claim 1, wherein assigning the serial number to the working service according to the identifier comprises:
  assigning the identifier to the working service as the serial number, or
  assigning a number calculated using a preset calculation method to the working service as the service number.

5. The method of claim 1, wherein:
numbering working services is initiated by the nodes on the ring instantly or periodically when a topology or service configuration is changed on the protection ring.

6. An apparatus for numbering working services on a protection ring of an Optical channel Data Unit of k order (ODUk channel protection ring), comprising:
  an allocating module, adapted to allocate an identifier to each node on the ODUk channel protection ring, and specify a direction on the ODUk channel protection ring;
  a first sending module, adapted to send, in the specified direction, a notification message to a second node downstream of the first node in the specified direction, the notification message including the identifier of the first node;
  a first triggering module, adapted to trigger the first sending module to send the notification message if the first node has an added or dropped working service on a first downstream segment in the specified direction;
  a first numbering module, adapted to assign a serial number to the working service according to the identifier in the notification message;
  a second triggering module, adapted to trigger the first numbering module to assign the serial number to the working service if the second node has the added or dropped working service on a second downstream segment in a reverse direction of the specified direction after receiving the notification message;
  a feedback module, adapted to return the serial number to the first node corresponding to the identifier after the first numbering module assigns the serial number to the working service according to the identifier; and
  a second sending module, adapted to forward, in the specified direction, the received notification message to a node downstream of the second node in the specified direction,
  wherein the second triggering is further adapted to trigger the second sending module to forward the received notification message to the node downstream of the second node when the second node does not have the added or dropped working service on the second downstream segment in the reverse direction of the specified direction and has the working services passing through in the specified direction.

7. The apparatus of claim 6, further comprising a splitting module, adapted to split a multicast service with multiple destination nodes into multiple working services on the node where the service passes through and is dropped.

* * * * *